United States Patent [19]

Potter et al.

[11] 3,984,642
[45] Oct. 5, 1976

[54] DIGITAL TELEPHONE AND SWITCHING SYSTEM EMPLOYING TIME DIVISION MULTIPLEX PULSE CODE MODULATION

[75] Inventors: Arthur Robin Potter, Saxmundham; Donald William Smith, Ipswich, both of England

[73] Assignee: The Post Office, London, England

[22] Filed: June 3, 1975

[21] Appl. No.: 583,505

[30] Foreign Application Priority Data

June 10, 1974 United Kingdom............ 25566/74
June 10, 1974 United Kingdom............ 25567/74
June 10, 1974 United Kingdom............ 25568/74

[52] U.S. Cl. .................... 179/15 BY; 179/18 FC
[51] Int. Cl.$^2$ ................................ H04J 3/12
[58] Field of Search......... 179/15 BY, 15 BS, 18 FC; 325/4

[56] References Cited

UNITED STATES PATENTS

| | | | |
|---|---|---|---|
| 3,492,435 | 1/1970 | Inose............... | 179/18 FC |
| 3,529,089 | 9/1970 | Davis............... | 179/15 AL |
| 3,772,475 | 11/1973 | Loffreda........... | 179/15 BY |
| 3,863,033 | 1/1975 | Chen............... | 179/15 FC |
| 3,909,540 | 9/1975 | Maryscuk.......... | 179/15 BY |
| 3,922,493 | 11/1975 | Brenig............. | 179/15 BY |

*Primary Examiner*—David L. Stewart
*Attorney, Agent, or Firm*—Hall & Houghton

[57] ABSTRACT

A digital telephone system is disclosed in which local groups of telephone lines are connected to respective concentrators which are themselves connected to switching centers by pulse code modulation highways. Data is transmitted on the highways as a succession of superframes where one superframe equals four multiframes, one multiframe equals 16 frames, one frame equals 30 channels and one channel equals eight digits. Channels 0 and 16 are used for signalling within the system and the remaining channels are used for data transmission between the telephone lines. The interpretation of channels 0 and 16 is determined by the particular frame and multiframe in which they occur. Each telephone line is identified by a combination of three channels representing a particular section of a concentrator, a particular block in the section, and a particular address in the block. Each concentrator has four sections and four highways. On each highway, the sections are scanned in turn, each for a period of one superframe. When all four sections have been scanned there is a one superframe period with no scan before the sections are scanned again on that highway. The superframe start times are mutually staggered by 16 frames on the four highways. Each highway transmits the relative superframe timings of the other three highways of the associated concentrator and this information is processed at the switching centers and used to control the superframe start time of the highway transmitting the information. The complement of the correct degree of stagger is added to the actual degree of stagger and the result compared with other totals similarly derived.

14 Claims, 14 Drawing Figures

DIGITAL TELEPHONE AND SWITCHING SYSTEM EMPLOYING TIME DIVISION MULTIPLEX PULSE CODE MODULATION

This invention relates to improvements in digital systems.

In a known form of signalling, information is transmitted as a time division multiplex pulse code modulation signal comprising a succession of frame, each frame consisting of a number of channels, and each channel consisting of a number of digits. It is known to interpret the contents of a channel in accordance with the frame in which it appears. For example, a channel can have one interpretation when in an even frame and another interpretation when in an odd frame. Thus, channel 0 in frames 1, 3, 5 . . . can carry information to be routed to a unit X and channel 0 in frames 0, 2, 4 . . . can carry information to be routed to a unit Y for example. This provides an economy in signalling because it is not necessary to send a further signal explaining channel content. It would clearly be advantageous to have a method of signalling which provided an even greater economy than the example given.

It is an object of the invention to provide an improved method of signalling in a digital system.

The present invention provides a method of signalling in a digital system using time division multiplex pulse code modulation (pcm), comprising transmitting a succession of superframes, each superframe consisting of a number of multiframe, each multiframe consisting of a number of frames, each frame consisting of a number of channels, and each channel consisting of a number of digits, and using the particular frame and particular multiframe in which a channel occurs to determine the interpretation of the data in that channel.

Where the system is a switching system for interconnecting respective ones of a multiplicity of data terminals, the method can comprise using some of the channels in each frame for transmitting data between the terminals, interpreting at least one of the remaining channels according to the particular frame and particular multiframe in which said at least one channel occurs, and using said at least one channel for controlling the interconnection of data terminals.

Where the system comprises a concentrator including a switching network having $n$ sections (where $n$ is an integer) and connected to a switching centre by a plurality of pcm highways, the method can comprise on each highway signalling to each of the $n$ sections in sequence with the starting points of the sequence staggered from highway to highway, and providing a blank period at the end of each sequence to prevent any one section being signalled on two highways simultaneously.

Each section can be signalled for one superframe, the blank period can be every $(n+1)$th superframe, and the superframe start times on the highways can be mutually staggered by $1/n$ superframes.

The method can comprise transmitting on each highway information relating to the superframe start times of the other highways, processing this information and using it to control the superframe start times of the highways.

Where there are $k$ frames in a superframe (where $k$ is an integer), the method can comprise transmitting on each highway numbers representing which frame the other highways have reached at the time of superframe synchronisation, and processing the information transmitted on each highway by adding to a first transmitted number normally equal to $k/n$ the complement $k - (k/n)$ adding to a second transmitted number nominally equal to $2k$ the complement $k - (2k/n)$, . . . and so on, and adding to the $j$th transmitted number (where $j$ is an integer) nominally equal to $jk/n$ the complement $k - jk/n$, and comparing the totals with one another.

Where the system is a telephone system in which a multiplicity of telephone lines are connected to a concentrator connected to a switching center, the method can comprise using said at least one channel for signalling between the switching center and the concentrator.

The method can comprise addressing a data terminal using a respective combination of a number of said at least one channels.

Each combination can be of three channels.

The invention also provides a digital signalling system comprising:

means to transmit a time division multiplex pulse code modulation signal comprising a succession of superframes, each superframe consisting of a number of multiframes, each multiframe consisting of a number of frames, each frame consisting of a number of channels, and each channel consisting of a number of digits, and means responsive to the particular frame and particular multiframe in which a channel occurs to determine the interpretation of that channel.

The system can be a switching system for interconnecting respective ones of a multiplicity of data terminals and comprise a concentrator having a multiplicity of inputs for connection to data terminals and connected to a switching center by a pcm highway, means being provided to transmit data between the terminals on some of the channels in each frame and to interpret at least one of the remaining channels according to the particular frame and particular multiframe in which said at least one channel occurs and to use said at least one channel for controlling the interconnection of data terminals.

The concentrator can include a switching network having $n$ sections (where $n$ is an integer) and can be connected to a switching center by a plurality of pcm highways, means being provided in the switching center to signal on each highway to each of the $n$ sections in sequence with the starting points of the sequence staggered from highway to highway and to provide a blank period at the end of each sequence to prevent any one section being signalled on two highways simultaneously.

The means to signal to the $n$ sections in sequence can be operative to signal to each section for one superframe, the blank period being every $(n+1)$th superframe, means being provided to mutually stagger the superframe start times by $1/n$ superframes.

The number of highways can be equal to $n$.

The system can comprise means within the concentrator to transmit on each highway information relating to the superframe start time of the other highways, means within the switching center to process this information and to control the superframe start times of the highways.

Where there are $k$ frames in a superframe (where $k$ is an integer), the system can comprise means within the concentrator to transmit on each highway numbers representing which frame the other highways have reached at the time of superframe synchronization, and means within the switching center to process the information transmitted on each highway by adding to a first transmitted number nominally equal to $k/n$ the complement $k - (k/n)$, adding to a second transmitted number nominally equal to $2k/n$ the complement $k - (24/n)$, . . . and so on, and adding to the $j$th tranmitted number (where J is an integer) nominally equal to $jk/n$ the complement $k - jk/n$, and comparing the totals with one another.

The means to process the information can comprise store means connected to receive the transmitted information, respective adder means for each number connected to the output of the store means, respective comparison means connected to the outputs of each adder means, and logic means connected to the outputs of the comparison means.

The system can be a telephone system and the concentrator can be connected to the switching center by a plurality of pcm highways.

By way of example only, certain illustrative embodiments of the invention will now be described with reference to the accompanying drawings, in which.

Figure 1:
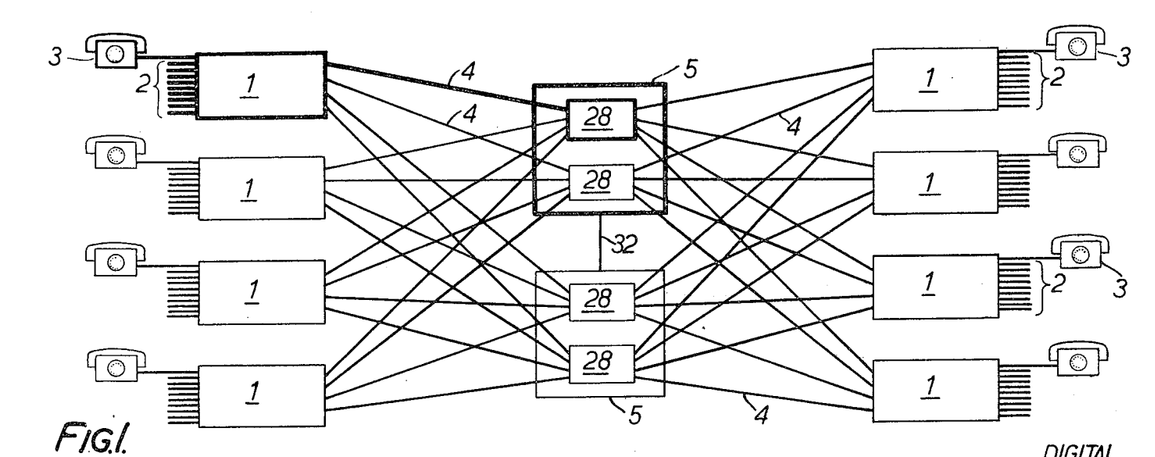
FIG. 1 shows an outline diagram of a telephone system embodying the invention.

FIG. 1 shows an outline diagram of a telephone system catering for 12,000 customers. The 12,000 customers are divided into eight local areas each having a locally positioned concentrator 1. The 1500 customers connected to each respective concentrator 1 are indicated diagrammatically by the lines 2 and telephone instruments 3. Each concentrator is connected by four highways to two switching centers 5, there being two highways from each concentrator to each of the two switching centers. Each switching center 5 includes two group controls 28 and each group control 28 is connected to eight highways 4, all from different concentrators. The concentrators and switching centers operate in a time division multiplex mode using pulse code modulation. It should be noted that the switching centers contain other circuits besides the group controls but these other circuits are omitted from FIG. 1 for clarity.

To avoid presenting the reader with too many complexities at once, the small part of FIG. 1 marked in extra bold outline will be discussed first of all. This small part consists of 1500 customers connected via one highway to one group control in a switching center.

Such an arrangement is not merely an aid to explanation but indeed could actually be put into practice if the need for a very simple system arises. The operation of this part will now be described in general terms. Supposing that customer X has lifted the handset of his telephone instrument to make a call, the concentrator will detect the calling condition on that customer's line and sends to the switching center a message indicating that customer X is calling. The switching center then sends back a message instructing the concentrator to connect customer X to channel M (say). The concentrator obeys this instruction and so connects the customer to the switching center. The switching center now sends dialling tone to the customer who responds by dialling the number of customer he wishes to call (customer Y, say).

The switching center responds to the dialled number by checking whether or not the called number is free. If customer Y is free the switching center sends the concentrator instructions to connect customer Y to channel N, say. The concentrator obeys this instruction by making the channel N connection and ringing customer Y. At this stage, customer X is connected to the switching center on channel M and customer Y is connected to the switching center on channel N. The switching center interconnects customers X and Y by connecting channel M to channel N.

This method of interconnecting two customers enables relatively simple equipment to be employed in the concentrator.

The working of the overall system of FIG. 1 is the same as the small part just discussed but it has much greater capabilities for handling calls. Each concentrator has four highways each connected to a respective group control and these group controls work independently in setting up connections. Connections can be set up between customers on different concentrators and not merely between customers on the same concentrator.

Figure 2:
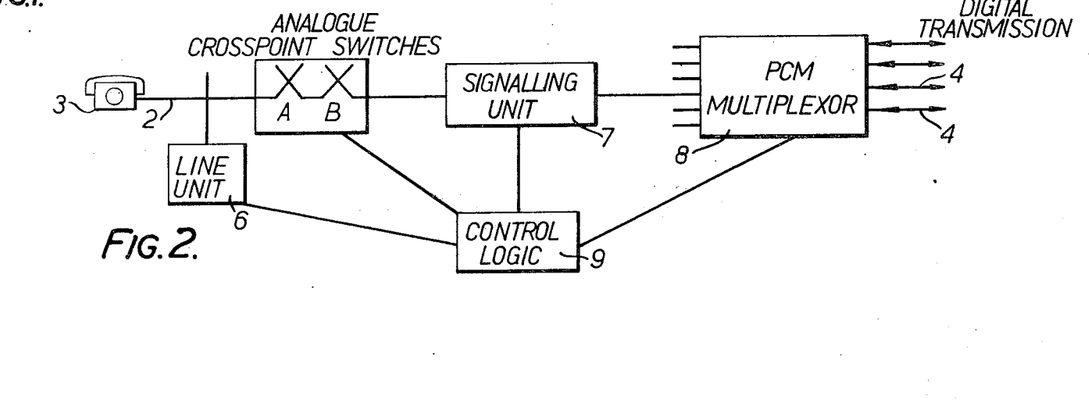
FIG. 2 is an outline diagram of a concentrator used in the system.

A block diagram of a concentrator 1 is shown in FIG. 2. The concentrator comprises a two-stage switching network A and B. Customers' lines 2 are connected as inputs to the A switch, each line having an individual LINE UNIT 6. The purpose of the LINE UNITS 6 is to detect the loop or calling condition on any customer's line and to signal the detection of the calling condition. After a path has been established through the switching network A and B the associated LINE UNIT is disconnected by a relay (not shown). The use and construction of LINE UNITS and switching networks A and B are familiar to those skilled in the art and do not require further description here.

The outputs of the B switch are connected to a SIGNALLING UNIT 7, in turn connected to a pcm MULTIPLEXOR 8. The SIGNALLING UNIT provides an analogue/digital interface in both directions between the customers and the pcm circuitry. It is capable of detecting the holding condition from a customer and can both ring and trip ringing. Those skilled in the art are familiar with the use of SIGNALLING UNITS and further description here is not necessary.

The MULTIPLEXOR 8 is a circuit of well known type and carries out time division multiplexing and de-multiplexing of pcm signals.

Operation within the concentrator is supervised by CONTROL LOGIC 9. The CONTROL LOGIC 9 takes incoming instructions from time-slot 16 in the pcm data, interprets them and routes them to an appropriate part of the concentrator, that is to the LINE UNIT, switching network or SIGNALLING UNIT or MULTIPLEXOR. It could, for example, take the form of Texas Instruments 7400 series logic elements.

The A switching networks are of the type described in U.S. Pat. No. 3,469,035.

Figure 3:
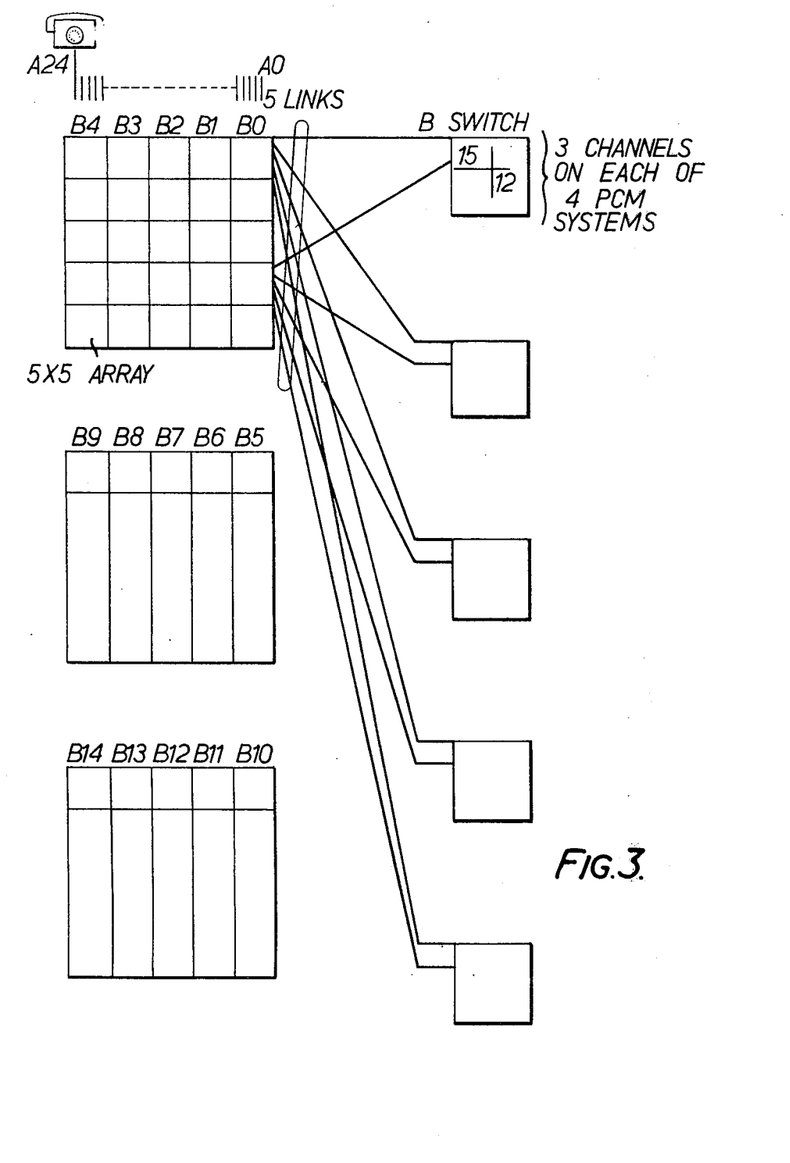
FIG. 3 is an outline diagram of switching arrangements in a concentrator.

The analogue switching networks A and B are built in separate sections so that the capacity of the concentrator can be expanded by the addition of one or more extra sections if the need arises. One such section is represented in FIG. 3, the total number of sections employed being four. The section comprises three A reed relay crosspoint switches and five B reed relay crosspoint switches interconnected by AB links as shown.

Each A switch consists of 25, 5 by 5 crosspoint arrays, which are commoned at the inlets in accordance with a slipped multiple wiring pattern. It should be understood that in considering the overall system directions are taken *from* the main switching center *out* to the customers. Therefore, the pcm channels are described as connected to the B switch *inlets* and customers are connected to the A switch *outlets*.

Each A switch serves 25 AB links on its inlets, and 125 customers on its outlets. The 25 AB links are connected to the B switches such that each 5 by 5A switch array has access to five different B switches.

Each B switch consists of 5 6 × 5 crosspoint arrays, there being 12 inlets to each array. The 12 inlets of each array are connected to three channels on each of the four pcm highways. Each customer has access to 15 circuits on each of the four pcm highways. The four sections of the concentrator are assembled with pairs of sections commoned at the B switch inlets: in this way a total of 1500 customers can be accommodated.

Information is transmitted on the pcm highways in frames comprising 32 channels, each channel comprising eight bits. The time division multiplexing has a nominal repetition rate of sixteen frames termed a multiframe. A group of four multiframes constitutes a superframe. The sampling rate is 8kHz giving an occupation time of 3.9 $\mu$S per channel, 125 $\mu$S per frame, 2mS per multiframe and 8mS per superframe. The relationship of the channels, frames, etc., is shown diagrammatically in FIG. 4.

Figure 4:
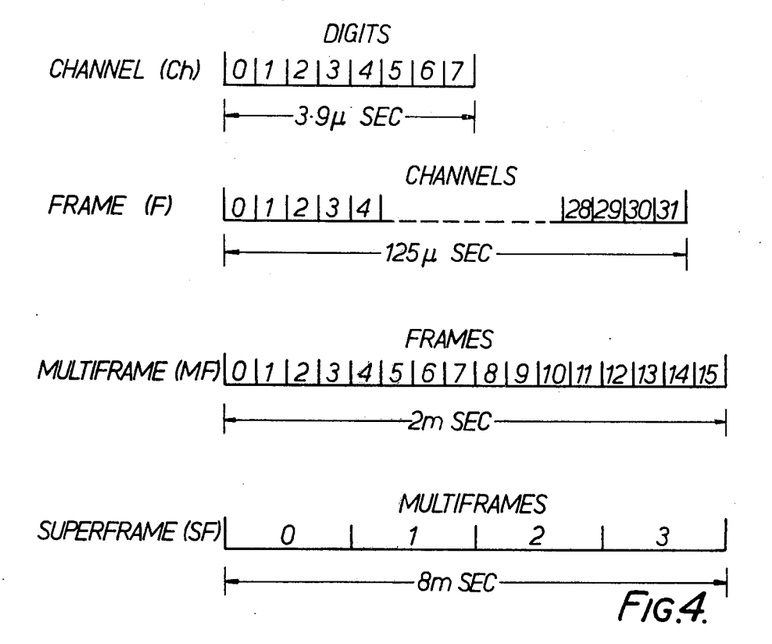
FIG. 4 shows the allocation of time in the time division multiplex systems used.

The pcm highways are required to transmit both the speech of customers (and also customers' non-speech data) and information and instructions for the internal control of the telephone system. The latter will be termed "signalling." In each frame, of the 32 channels designated 0–31 in FIG. 4, 30 are used for speech or data while channels 0 and 16 are reserved for signalling. Further information on the use of the channels 0 and 16 will be given later.

Figure 5:
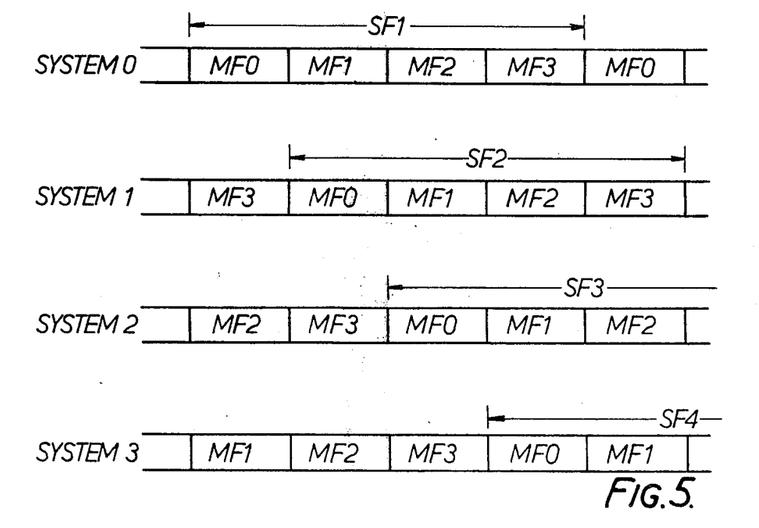
FIG. 5 is a further illustration of time allocation.

The superframe start times in the four highways of each concentrator are staggered as shown in FIG. 5 (further explanation will be given later).

The provision of special facilities such as coin fee checking for coin boxes, malicious call alarm, customer private metering, howler and line testing will now be described. These special facilities are provided here by the use of auxiliary signalling units. Two arrangements will be described which may be provided as alternatives or both may be used depending on the facilities required. The first arrangement (FIG. 6) is more suited to the provision of frequently required special facilities to a small number of customers. The second arrangement (FIG. 7) is more suited to the provision of less frequently required special facilities to a large number of customers. Thus, the first arrangement is suitable for coin fee checking, malicious calls and private metering and the second arrangement is suitable for howler and line testing. The function of the auxiliary signalling units is to provide an interface between the p.c.m. systems and equipment providing the special facilities.

Figure 6:
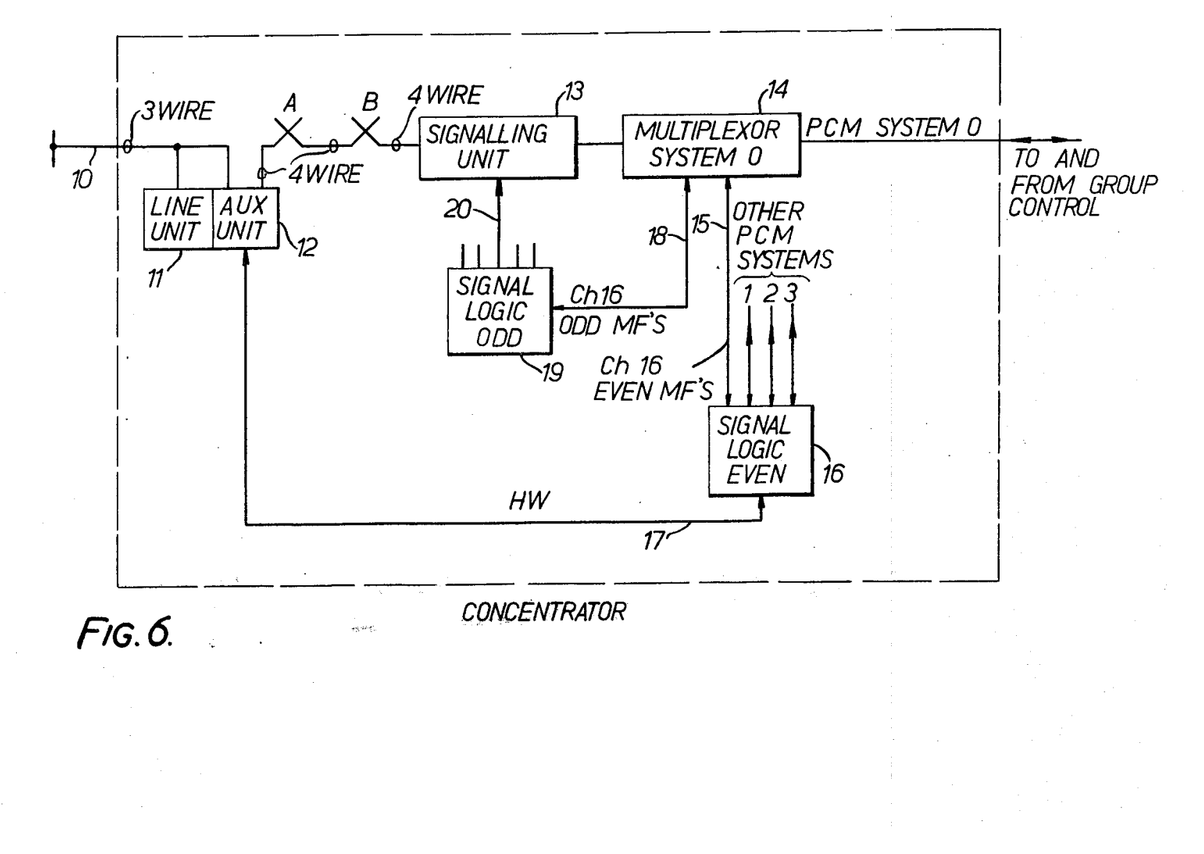
FIG. 6 is a more detailed schematic diagram of a concentrator.

FIG. 6 shows a concentrator for providing special facilities by means of auxiliary units (only one such unit is illustrated). A customer's line 10 connected to the concentrator is terminated on a line unit 11 and on an auxiliary unit 12 which is connected to the A switch. Other lines (not shown) requiring a special facility are similarly provided with an auxiliary unit.

The B switch is connected to a signalling unit 13, which in turn is connected to multiplexor 14 (only one of the pcm systems is illustrated). The signalling unit 13 provides an individual circuit for each of the channels of the pcm. system to which it is connected.

Channel 16 in each even multiframe is routed by multiplexor 14 and lead 15 to signal logic even 16 which receives similar inputs from each of the three remaining pcm. systems of the concentrator. Signal logic even 16 multiplexes channel 16 in even multiframes of all four pcm. systems on to a common highway 17 which is connected to the auxiliary signalling unit 12. Signal logic even 16 can be realized in Texas Instruments 7400 series logic.

Signal logic even 16 is also operative to de-multiplex channel 16 in even multiframes in signals from the auxiliary signalling unit 12 on highway 17 to each of the four pcm. systems.

Signalling information is gated into and out of the auxiliary signalling unit 12 in accordance with the particular speech or data channel being used by the customer's line to which the auxiliary signalling unit 12 is connected.

Gating of the auxiliary signalling unit 12 is controlled by a pulse indicative of the channel and is transmitted from the signalling unit 13 over an extra wire through the B and A switches to the auxiliary signalling unit 12. Thus, there is a four-wire circuit between the signalling unit 13 and the auxiliary unit 12 through the B and A switching stages. Normally, a three-wire circuit comprising a speech or data pair and a hold wire would be used. A connection between a customer's line and one of the main switching centers 5 (FIG. 1) is established under control of a common control unit (see later) in one of the main switching centers, a connection being established from a group control in the switching center (see later) via a pcm. system to a concentrator, and via multiplexor 14, signalling unit 13, B switch and A switch to the customer's line.

The signalling from and to the pcm. systems is multiplexed in signal logic even 16 on to the highway 17 and by means of the concentrator clock (not shown) a pulse is sent over the fourth wire from the signalling unit 13 to gate the signalling into or out of the auxiliary unit concerned. Interfaces included in the signal logic even 16 store the data until it is required and are provided in both the go and return highways. This arrangement allows the use of an asynchronous concentrator clock.

Channel 16 in each odd multiframe is routed via multiplexor 14 and lead 18 to signal logic odd 19 which is connected by lead 20 to the signalling unit 13. Signal logic odd 19 can be realized in Texas Instruments 7400 series logic.

Figure 7:
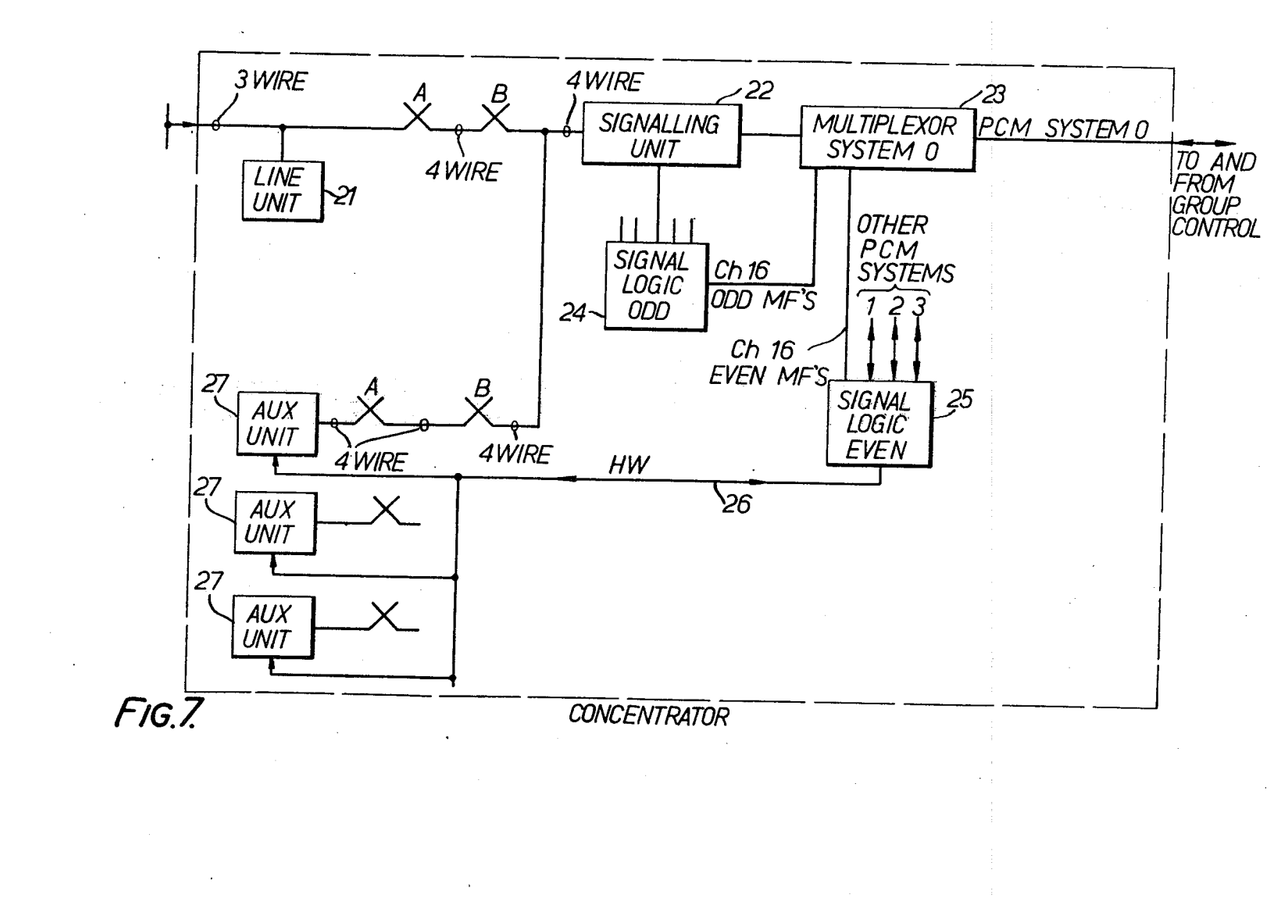
FIG. 7 is a more detailed schematic diagram of an alternative form of concentrator.

In the second arrangement shown in FIG. 7 a common group of auxiliary units is available for connection to customers' lines.

FIG. 7 shows a line unit 21, A and B switches, a signalling unit 22, a multiplexor 23, signal logic odd 24 and signal logic even 25 connected in a similar manner to the components of FIG. 6.

In FIG. 7 the normal three-wire circuit exists between a customer's line unit 21 and the A switch but a fourth wire is included between all of the A switches and the B switches and between the B switches and the signalling unit 22.

Auxiliary units 27 are terminated on a block of an A switch section in exactly the same manner as customers' lines. A highway 26 is connected to each of the auxiliary units 27.

In operation, a connection between a customer's line and a main switching center is established in a similar manner to that described in respect of FIG. 6. The connection is made between the customer's line, A and B switching stages, signalling unit 22, multiplexor 23 and a pcm channel.

Assuming that a particular customer has been connected to a main switching center and a signal has been conveyed that the facility of an auxiliary unit is required, the main switching center then sets up another connection, via the same B switch as used for the customer connection, and via the same or a different A switch to an auxiliary unit 27 (auxiliary units can be terminated on A switches of separate groups or alternatively intermixed with customer line termination on common groups).

The manner of establishing connections to an auxiliary unit 27 is exactly the same as for establishing a connection to a customer's line.

Once the parallel connections (one to a customer's line and one to an auxiliary unit) are established signalling to the auxiliary unit by means of channel 16 is the same as that already described for an auxiliary unit individually associated with a customer's line.

The respective arrangements described with reference to FIGS. 6 and 7 can be used exclusively or a combination of the two can be employed so that certain customers' lines have individual auxiliary units, while other customers' lines have auxiliary units from a common group selectively associated with them.

Figure 8:
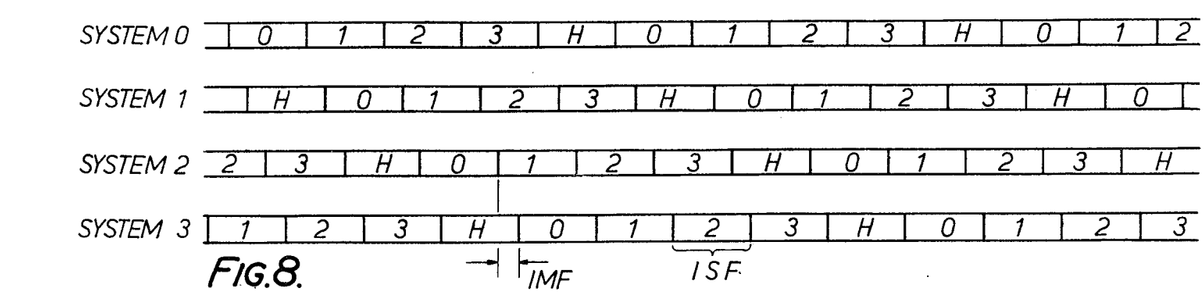
FIGS. 8, 9, and 10 are further illustrations of time allocation.

FIG. 8 shows the time relationship between superframes in the four pcm systems of a concentrator. In order that a superframe in one system cannot overlap the same designated superframe of another system, the time interval of a superframe occurs between each four superframes, during which time, no scan takes place (see later). This time interval is termed here a 'hiccup' superframe.

Figure 9:
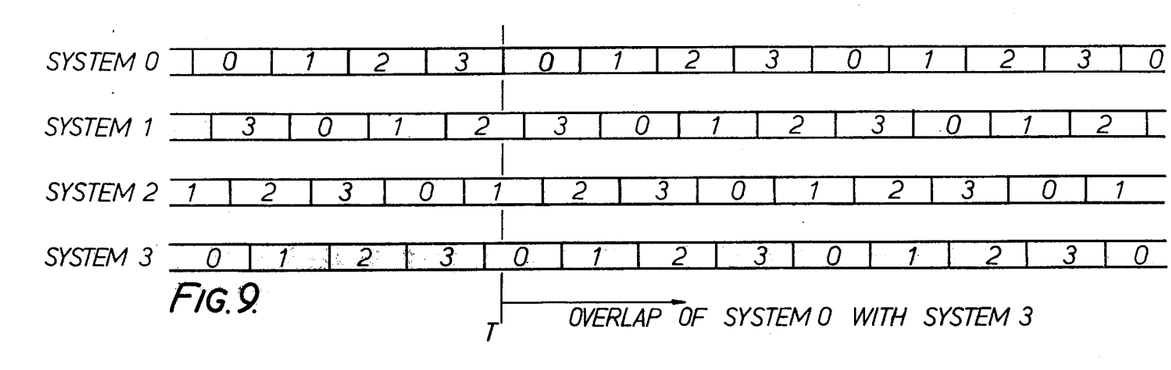

FIG. 9 shows the disadvantage resulting from not using a hiccup superframe. As shown in the Figures there is an undesirable overlap between system 0 and system 3.

As explained earlier, each pcm. system operating between a concentrator and a main switching center consists of 32 channels. Each channel is formed by a time slot containing 8-bit signals, and operating at a sampling rate of 8 KHz, giving an occupation time of 3.9$\mu$Sec. for each channel, and 125$\mu$Sec. for the 32 channels, this period being termed a FRAME (F).

Signalling over the pcm. system is on a time division multiplex (t.d.m.) basis, the nominal repetition rate being a MULTIFRAME (MF) consisting of 16 FRAMES.

The signalling that is required to take place on a pcm. system between a concentrator and a main switching center, is of two types, namely— i. customer and concentrator signalling, in which customers' lines are scanned and marked at a slow rate, and ii. channel signalling, in which, once a connection has been established between a customer and a main switching center, the signalling unit at the concentrator, signals about the customer at a faster rate during the routing and supervision of the connection.

The 32 channels of a pcm. system are designated 0–31, 30 of the channels being used for speech or data, while two, channels 0 and 16 are used for signalling.

Channel 0 in ODD frames is used for the frame synchronization pattern (sync), which is a 7-bit code, and channel 0 in EVEN frames is used for the customers' and concentrator control signalling.

Channel 16 is used for MULTIFRAME sync. and channel signalling. Channel 16 in frame F0 of both ODD and even multiframes is used for multiframe synchronization. In frames $F_1$ to $F_{15}$, in ODD multiframes, channel 16 is used for signalling between a main switching center and a concentrator signalling unit. In frames $F_1$ to $F_{15}$, in EVEN multiframes, channel 16 is used for signalling between a main switching center and a concentrator auxiliary unit.

In order to provide the necessary signalling requirements, a SUPERFRAME (SF) made up of four MULTIFRAMES (MF0, MF1, MF2, MF3) is employed (see FIG. 5). The signalling arrangement from a main switching center to a concentrator uses channel 0 in EVEN frames and will now be explained in detail.

The various signalling arrangements are allocated as follows:

SUPERFRAME Synchronisation

MF0/F0. This is sent at the start of each SUPERFRAME.

SCAN or ROUTE Instruction

MF0/F2. This is a signal sent from a main switching center, telling a concentrator whether to scan for a new calling condition, or if information is to be routed to a customer.

SECTION ADDRESS

MF0/F4. As with the rest of the addresses, this is produced by using a 'flag' in a particular bit digit position to indicate the address of a SECTION in a concentrator, e.g., bit 2 being a flag indicating the address of SECTION 2.

BLOCK ADDRESS (each column of a 5X5 crosspoint array in an A switch is termed a block).

MF1/F2, MF1/F4, MF1/F6, MF1/F8, MF1/F10, MF1/F12 and MF1/F14.

MF2/F2, MF2/F4, MF2/F6, MF2/F8, MF2/F10, and MF2/F12.

In this case, a flag in bit 5 or in bit 7, represents a BLOCK address, e.g., MF1/F2, bit 5 signals block 0. MF2/F10, bit 7 signals block 23.

CUSTOMER ADDRESS (each row of a 5×5 cross-point array in an A switch is connected to a respective link to a B switch).

MF0/F6, MF0/F8, MF0/F10, MF0/F12, and MF0/F14.

MF1/F2, MF1/F4, MF1/F6, MF1/F8, MF1/F10, MF1/F12 and MF1/F14.

MF2/F2, MF2/F4, MF2/F6, MF2/F8, MF2/F10, MF2/F12 and MF2/F14.

MF3/F2, MF3/F4, MF3/F6, MF3/F8, MF3/F10 and MF3/F12.

The first four bits in each slot are used. The first three bits are used for the customers' signalling, representing Busy, Free and Mark conditions, respectively. The fourth bit is a Mark in the AB Link.

A flag in any one of these positions indicates the particular signal, i.e. a flag in bit 0 represents the message, 'busy the customer.'

An example of a particular signal message will now be given. If customer number 10 in BLOCK five of SECTION zero, is to be set to 'busy,' the signalling condition will be a flag in particular ones of the bits zero to seven of channel 0 in EVEN frames, as follows — i. bit 0 of the SECTION ADDRESS MF0/F4, indicating SECTION O:
ii. bit 7 of MF1/F6, indicating BLOCK 5.
iii. bit 0 of MF1/F12 indicating 'busy customer A10'.

In the opposite direction, i.e., from concentrator to main switching center, a similar arrangement applies, but with certain differences, as under — i. no SCAN instruction is required,
ii. SECTION ADDRESS is given in the last four bits, 4 to 7 of MF0/F4.

Figure 10:
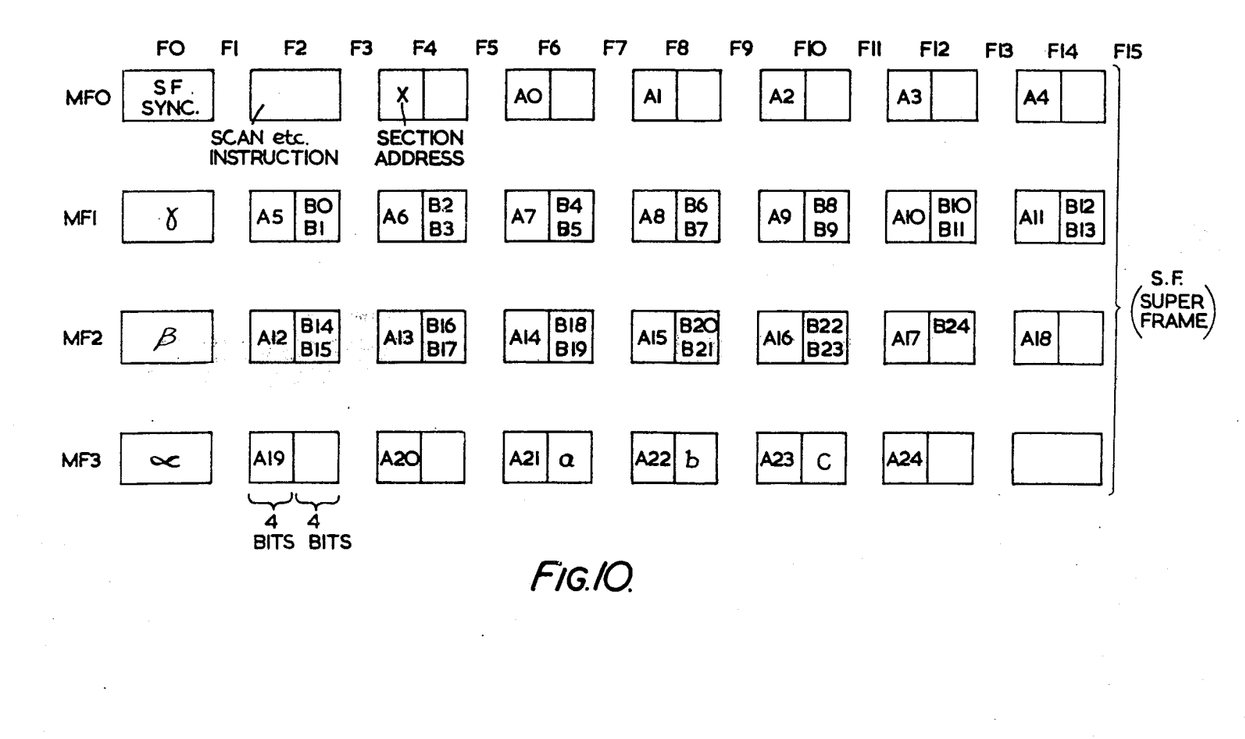

FIG. 10 shows the allocation of channel 0 in even frames over one superframe.

In the first multiframe, MF0, channel 0 has the following contents:

F0 — superframe synchronization
F2 — scan or route instruction
F4 — section address
F6 — customer address A0
F8 — customer address A1
F10 — customer address A2
F12 — customer address A3
F14 — customer address A4

In the second multiframe, MF1, channel 0 has the following contents:

F0 — information signal γ (see later)
F2 — customer address A5 (first four bits) and block addresses B0 and B1 (last four bits)
F4 — customer address A6 and block addresses B2 and B3
F6 — customer address A7 and block addresses B4 and B5
F8 — customer address A8 and block addresses B6 and B7
F10 — customer address A9 and block addresses B8 and B9
F12 — customer address A10 and block addresses B10 and B11
F14 — customer address A11 and block addresses B12 and B13

In the third multiframe, MF2, channel 0 has the following contents:

F0 — information signal β (see later)
F2 — customer address A12 and block addresses B14 and B15
F4 — customer address A13 and block addresses B16 and B17
F6 — customer address A14 and block addresses B18 and B19
F8 — customer address A15 and block addresses B20 and B21
F10 — customer address A16 and block addresses B22 and B23
F12 — customer address A17 and block address B24
F14 — customer address A18

In the fourth multiframe, MF3, channel 0 has the following contents:

F0 — information signal α (see later)
F2 — customer address A19
F4 — customer address A20
F6 — customer address A21 and signal $a$ (see later)
F8 — customer address A22 and signal $b$ (see later)
F10 — customer address A23 and signal $c$ (see later)
F12 — customer address A24
F14 — not allocated.

Figure 11:
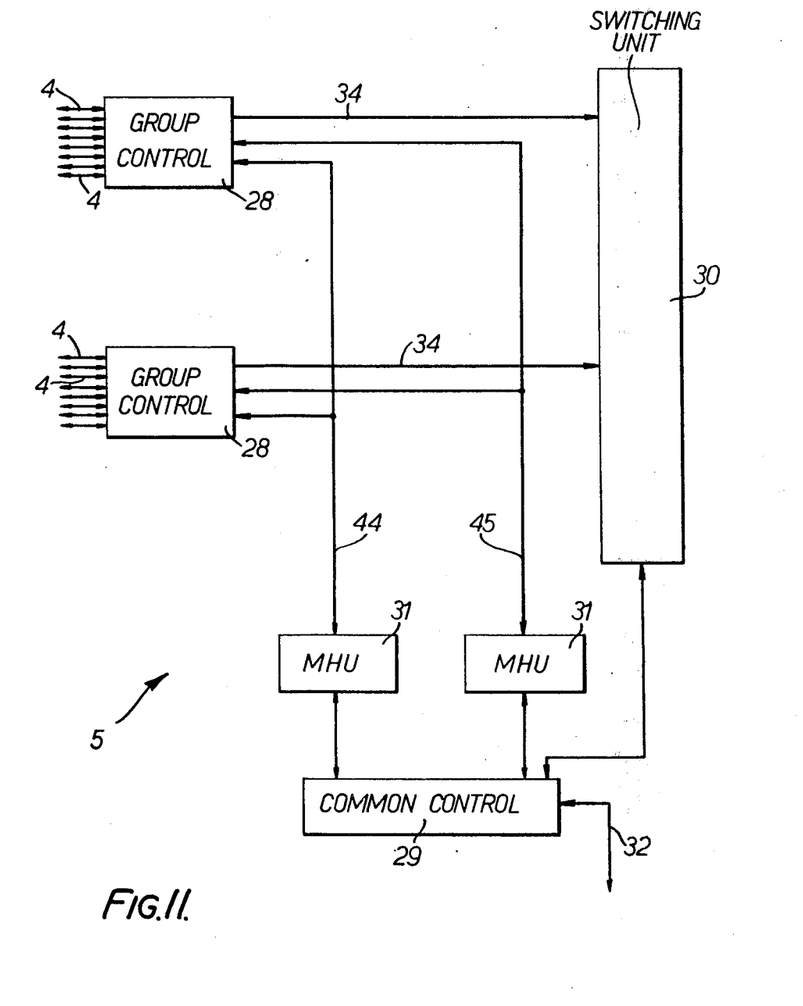
FIG. 11 shows an outline diagram of a main switching center.

A block diagram of a main switching center 5 is shown in FIG. 11. Each main switching center includes two group controls, each group control being connected to one highway 4 from each of eight concentrators 1 (FIG. 1). Operation within each main switching center is under control of a common control 29 and switching takes place in a main switching unit 30. Message handling units 31 provide an interface between the group controls 28 and the common control 29. A control link 32 is provided between the common controls of one and the other main switching centers. If a switching center is unable to effect a required connection, instructions can be passed over this link to cause the other switching center to attempt the connection. The switching unit 30 is of the type described in U.S. patent application Ser. No. 308,551.

Figure 12:
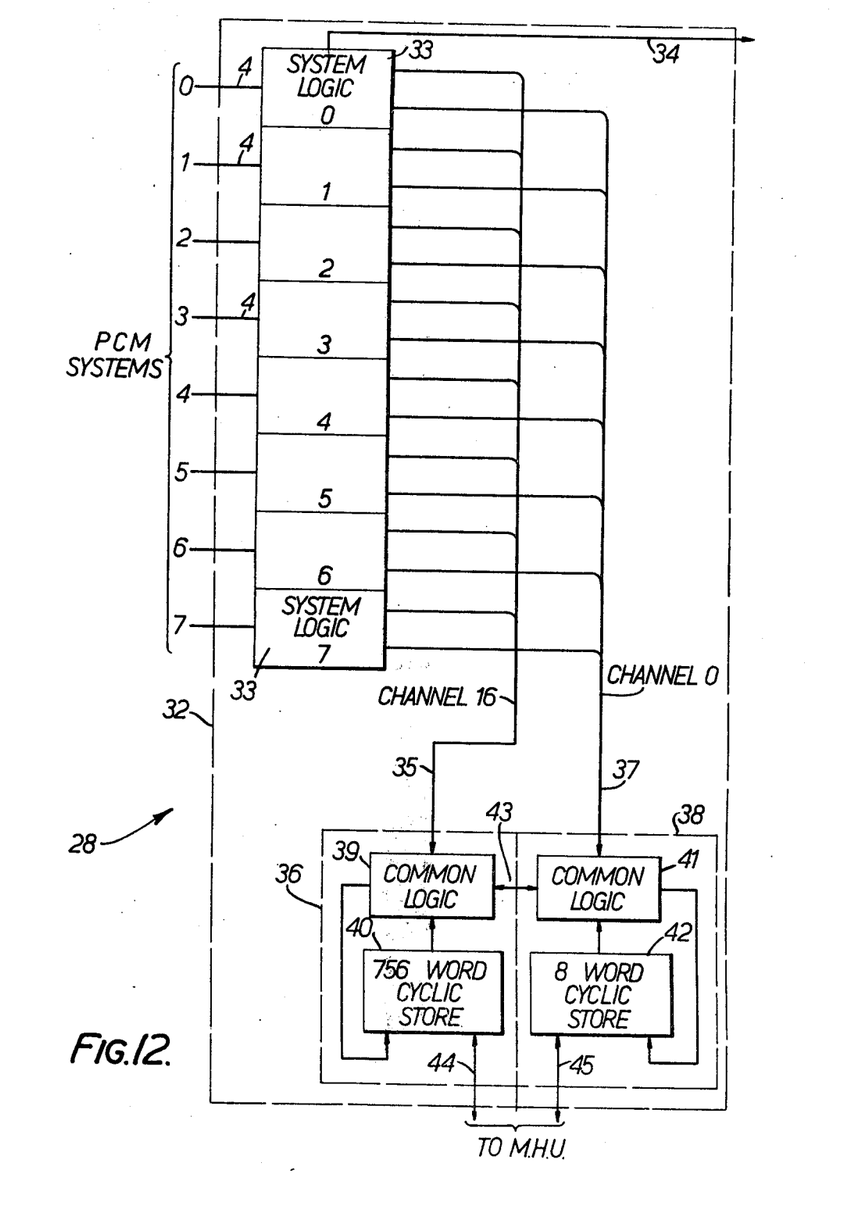
FIG. 12 shows an outline diagram of one of several group controls used in a main switching center.

A block diagram of a group control is shown in FIG. 12. Each highway 4 is terminated in the group control on a respective system logic 33. The speech (or data) outputs of the highways (30 of the 32 channels in each frame) are brought out to the main switching unit on leads 34 (only one lead is illustrated).

Channel 16 from each highway 4 is multiplexed on line 35 as input to a time shared logic unit 36, while channel 0 from each highway 4 is multiplexed on line 37 as input to another time shared logic unit 38. Logic unit 36 comprises units 39 and 40 and logic unit 38 comprises units 41 and 42. Units 41 and 42 serve the multiplexed channel 0's for processing the customers' signalling and units 39 and 40 serve the multiplexed channel 16's for processing the channel signalling. Information relating to the states of channels, free or busy, is passed between the two units 39 and 41 by lead 43. Units 39 and 41 are common logic units and units 40 and 42 are 256-word and 8-word cyclic stores respectively. Stores 40 and 42 are connected by leads 44 and 45 respectively to respective message handling units 31. Texas Instruments 7400 series logic is suitable for the logic circuitry of FIG. 12.

Cyclic store 40, for channel 16, and cyclic store 42, for channel 0, provide storage for recording the previous history of each of the multiplexed channels. The instantaneous signalling is presented to the common logic 39, for channel 16, and to common logic 41, for channel 0, which make a decision and either rewrite the cyclic store, or simply recycle it.

In order to achieve reliability and security of operation of a concentrator, it is necessary for the two group controls in a main switching center to be as independent of each other as possible, but at the same time each of the group controls within a main switching center must at any instant in time be concerned with what is happening in the other three group controls. Successful interworking between the four group controls and any particular concentrator is achieved by having the superframe start times for the four pcm systems of the concentrator staggered by sixteen frames. This avoids the possibility of double connections caused by two or more group controls trying to set up connections for the same call.

This staggering is achieved by sending information regarding the relative position of the SUPERFRAME starts of the systems back to the Group Control in MF1/F0, MF2/F0 and MF3/F0, and here designated $\alpha$, $\beta$ and $\gamma$ respectively (see FIG. 10).

As previously stated, for the purpose of this example, a concentrator is formed by four SECTIONS.

In order to prevent a SECTION being simultaneously addressed by more than one Group Control, it is arranged that the systems scan through the SECTIONS in an orderly sequence as shown in FIG. 8. The hiccup SUPERFRAME (H) occurs between each group of four SECTIONS, during which time no scan operation takes place. FIG. 9 shows the arrangement without the hiccup SUPERFRAME, and it will be seen that, for example, at the time T, SECTION 0 is being addressed by System 0 and by system 3, that is, being addressed by both at the same time.

The use of the hiccup SUPERFRAME prevents this.

The arrangement shown in FIG. 8 keeps the systems spaced correctly provided no system is holding a SECTION for move than one SUPERFRAME. When information is to be routed to a customer however, a system needs to address a SECTION for more than one SUPERFRAME, and without additional information this will lead to two systems addressing the same SECTION. In order to prevent this, bits 4–7 of MF3/F6, MF3/F8 and MF3/F10 are used to carry appropriate information.

This information is 'up-to-date' because it is taken after the last SECTION address, and each of the slots is used to indicate the SECTION being addressed by a system. The Group Control is thus told if the SECTION it wishes to address is occupied or not. Returning the information to the Group Control in this way has the advantage that since it is told if it can address a SECTION, it does not try to do this unless it is possible. This means a saving in the concentrator, in that it is not necessary to provide inhibition to prevent a SECTION being scanned by more than one system.

As explained each concentrator is connected to two main switching centers, the four pcm. systems being divided so that two systems go to a first main switching center and two to a second main switching center, as shown in FIG. 1. Each pcm. system of a concentrator terminates on a respective group control of a main switching center.

Each group control serves eight different concentrators.

The signalling format employed on the pcm. systems between a concentrator and the group controls of a main switching center, has already been described, and a basic superframe of 64 frames is employed. Successful interworking between four group controls and a concentrator is achieved, as explained, by staggering the superframe start times for the four pcm. systems. In F0 of MF0 is the superframe synchronization for the system under consideration, while in F0 MF1, F0 MF2 and F0 MF3 there is signalling information, designated $\gamma$, $\beta$ and $\alpha$ respectively, relating to the relative superframe timings of the other three pcm. systems serving that concentrator. The signalling information in each case, is a 6-bit binary number identifying which frame of the 64 frames constituting a superframe, the other systems have reached at the time of the superframe synchronization of the system under consideration.

Figure 13:
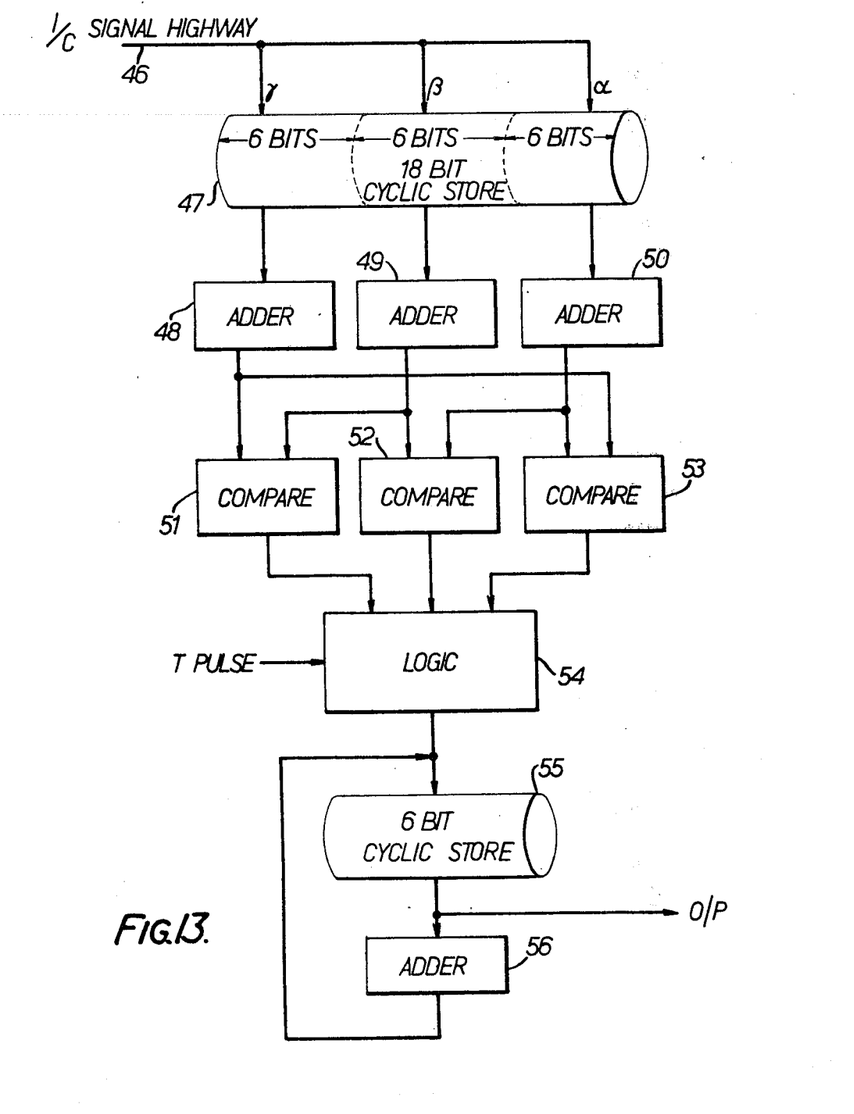
FIGS. 13 and 14 show details of further circuits of a main switching center.

Consider now one of the four group controls terminating eight pcm. systems, each from a different concentrator. A circuit arrangement in order to achieve alignment of the eight systems within the group control, and also to ensure that the group control knows what the other three group controls are doing at any instant in time, is shown in FIG. 13.

The 6-bit binary number signalling information in channel 0 of EVEN frames of the eight pcm. systems incoming to the group control, and designated $\gamma$, $\beta$ and $\alpha$ in respect of the other three systems in each case is multiplexed in the group control on to a signal highway 46. The superframe timings of the other three systems for each of the eight systems, are gated in turn into separate locations in a CYCLIC STORE 47, each system having a word of storage, i.e., 18 bits available.

Each of the eight systems incoming to a group control is processed in turn.

After the superframe timings $\gamma$, $\beta$ and $\alpha$ for one concentrator have been stored in CYCLIC STORE 47, each 6-bit storage is transferred to an individual ADDER CIRCUIT, that of $\gamma$ to ADDER 48, $\beta$ to ADDER 49, and $\alpha$ to ADDER 50.

Since the four group controls have their relative superframe timings staggered by 16 frames, the circuits 48, 49 and 50, add the binary numbers for the amounts 48, 32 and 16 respectively, to the number representing the superframe start time transferred from the CYCLIC STORE 47. If the superframe start times are correct, the resultant sums in each of the ADDERS 48, 49 and 50 should be the binary number for 64. The sum outputs of the ADDERS 48, 49 and 50 are compared in pairs in COMPARATORS 51, 52 and 53, and the three outputs of these are applied as inputs to a LOGIC CIRCUIT 54 the output of which is used to preset a 6-bit BINARY COUNTER comprising CYCLIC STORE 55 and ADDER 56. The output of the STORE 55 is used to bring the superframe start time of the system connected to the group control into alignment with the other three systems of that concentrator. Texas Instruments 7400 series logic can be used for the circuitry of FIG. 13.

It will be appreciated that each of the four group controls operates a circuit arrangement as shown in FIG. 13. In order to prevent simultaneous control operation of superframe timing in the group controls, it is arranged that the operation in each group control takes place during a specified T pulse period, a different period being allocated for each group control.

From the foregoing it may be seen that it is possible for the eight different concentrators served by a group control to have different superframe timings, although for a particular concentrator its four group controls will be aligned correctly.

Further to the synchronization of the group controls as described relative to FIG. 13, it is also necessary to ensure that a particular SECTION of a concentrator is not addressed by more than one group control at a time. The group controls look in turn at each of the four SECTIONS of a concentrator, one SECTION in each superframe, and then suffer an enforced idle period, this being known as the hiccup method. In this way the customers' lines in a concentrator may be scanned by each group control in turn. In order to do this the SECTION address must be generated correctly by a group control, and a circuit for accomplishing this is shown in FIG. 14.

A concentrator sends to the group control of each of its four systems, the addresses of its SECTIONS that are being accessed, in each case by the other three group controls. These addresses are sent at the end of a superframe period, the 4-bit addresses being given in F6, F8 and F10 of MF3 (see FIG. 10) and will be termed here $a$, $b$ and $c$ respectively.

Figure 14:
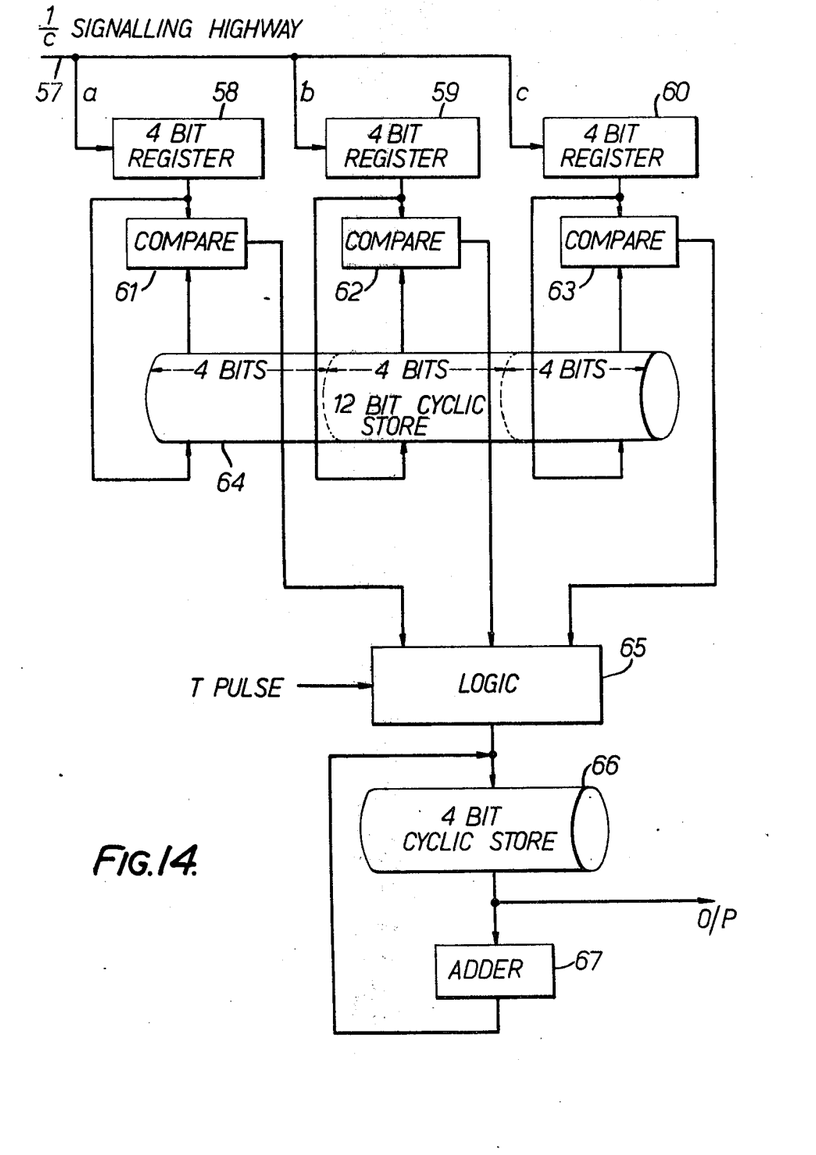

With reference to FIG. 14, the 4-bit binary number signalling information of each of the $a$, $b$ and $c$ SECTION addresses is multiplexed in the group control onto a signalling highway 57. The three addresses $a$, $b$ and $c$ are gated in turn into REGISTERS 58, 59 and 60 respectively.

Since a group control is only allowed to begin addressing a SECTION at a particular time (F4 MF0) any changes in a SECTION address can only occur at that time. The outputs of the REGISTERS 58, 59 and 60 are applied to COMPARE circuits 61, 62 and 63, and also to 12-bit CYCLIC STORE 64, which has an output to each of the COMPARE circuits 61, 62 and 63. In these COMPARE circuits the addresses received by REGISTERS 58, 59 and 60 are compared with the previous addresses held in the CYCLIC STORE 64. The output of the COMPARE circuits 61, 62 and 63 are applied to a LOGIC circuit 65, which deduces which SECTION should in fact be addressed, and writes an entry in a 4-bit CYCLIC STORE 66 accordingly, the SECTION being indicated on the STORE output.

The SECTION address in the 4-bit CYCLIC STORE 66 is incremented every superframe by an ADDER 67. On the fifth count the all zeros state is used to indicate the idle hiccup period, of a SECTION:

Texas Instruments 7400 series logic can be used for the circuitry of FIG. 14.

The cyclic stores employed in FIGS. 13 and 14 can for example, be drum types of stores or shift registers.

While particular embodiments of the invention have been described, it will be understood that other forms and variations are possible.

For example, the use of two main switching centers having two group controls each has been described and while this arrangement provides a measure of security in the event of a breakdown it is, however, possible to use only one main switching center comprising four group controls.

If only one main switching center is used, it will be apparent that all the pcm highways 4 shown in FIG. 1 should terminate in the one main switching center. There would be a single common control without the control link 32 of FIG. 11.

It should be understood that the numbers of component parts (for example, the number of concentrators and group controls) of the system is given by way of example only. In practice, of course, the system would be adapted to provide the service required to fulfil the need outstanding.

For example, each group control has been shown as serving eight different concentrators but some (or all) of the group controls could serve fewer or more than eight concentrators. The interconnection of concentrators and group controls can likewise be arranged as occasion demands, for example, it is not necessary, but it is desirable for security that each concentrator highway should be connected to a different group control.

The actual signalling format described is for explanatory purposes only. It will be evident that other arrangements are possible, and that the data location for various functions are open to change.

We claim:

1. A method of signalling in a digital system using time division multiplex pulse code modulation (pcm), the system being a switching system for interconnecting respective ones of a multiplicity of data terminals and comprising a concentrator including a switching network having $n$ sections (where $n$ is an integer) and connected to a switching center by a plurality of pcm highways, the method comprising transmitting a succession of superframes, each superframe consisting of a number of multiframes, each multiframe consisting of a number of frames, each frame consisting of a number of digits, using some of the channels in each frame for transmitting data between the terminals, interpreting at least one of the remaining channels according to the particular frame and particular multiframe in which said at least one channel occurs, and using said at least one channel for controlling the interconnection of data terminals, on each highway signalling to each of the $n$ sections in sequence with the starting points of the sequence staggered from highway to highway, and providing a blank period at the end of each sequence to prevent any one section being signalling on two highways simultaneously.

2. A method as claimed in claim 1, wherein each section is signalled for one superframe, the blank period is every $(n + 1)$th superframe, and the superframe start times on the highways are mutually staggered by $1/n$ superframes.

3. A method as claimed in claim 2, comprising transmitting on each highway information relating to the superframe start times of the other highways, processing this information and using it to control the superframe start times of the highways.

4. A method as claimed in claim 3, wherein there are $k$ frames in a superframe (where $k$ is an integer), and comprising transmitting on each highway numbers representing which frame the other highways have reached at the time of superframe synchronization, and processing the information transmitted on each highway by adding to a first transmitted number nominally equal to $k/n$ the complement $k - k/n$ adding to a second transmitted number nominally equal to 2k the complement $k - (2k/n)$, ... and so on, and adding to the $j$th transmitted number (where $j$ is an integer) nominally equal to $jk/n$ the complement $k - (jk/n)$, and comparing the totals with one another.

5. A method as claimed in claim 1, wherein the system is a telephone system in which a multiplicity of telephone lines are connected to a concentrator connected to a switching center, the comprising using said at least one channel for signalling between the switching center and the concentrator.

6. A method as claimed in claim 5 comprising using a respective combination of a number of said at least one channels to identify an address within one of said concentrator sections.

7. A method as claimed in claim 6 wherein each combination is of three channels.

8. A digital switching system for interconnecting respective ones of a multiplicity of data terminals and comprising:
- a concentrator having a multiplicity of inputs for connection to said data terminals, the concentrator including a switching network having $n$ sections,
- a switching center connected to said concentrator by a plurality of pcm highways,
- means to transmit, as a time division multiplex pulse code modulation signal comprising a succession of superframes, each superframe consisting of a number of multiframes, each multiframe consisting of a number of frames, each frame consisting of a number of channels, and each channel consisting of a number of digits, data between the terminals on some of the channels in each frame and to interpret at least one of the remaining channels according to the particular frame and particular multiframe in which said at least one channel occurs and to use said at least one channel for controlling the interconnection of data terminals, and
- means in said switching center to signal on each highway to each of the $n$ sections in sequence with the starting points of the sequence staggered from highway to highway and to provide a blank period at the end of each sequence to prevent any one section being signalled on two highways simultaneously.

9. A system as claimed in claim 8, wherein the means to signal to the $n$ sections in sequence is operative to signal to each section for one superframe, the blank period being every $(n+1)$th superframe, means being provided to mutually stagger the superframe start times by $1n$ superframes.

10. A system as claimed in claim 9, wherein the number of highways is equal to $n$.

11. A system as claimed in claim 10, comprising means within the concentrator to transmit on each highway information relating to the superframe start time of the other highway, means within the switching center to process this information and to control the superframe start times of the highways.

12. A system as claimed in claim 11, wherein there are $k$ frames in a superframe (where $k$ is an integer), and comprising means within the concentrator to transmit on each highway numbers representing which frame the other highways have reached at the time of superframe synchronization, and means within the switching center to process the information transmitted on each highway by adding to a first transmitted number nominally equal to $k/n$ the complement $k-(k/n)$, adding to a second transmitted number nominally equal to $2k/n$ the complement $k-(2k/n)$, ... and so on, and adding to the $j$th transmitted number (where $j$ is an integer) nominally equal to $jk/n$ the complement $k-(jk/n)$, and comparing the totals with one another.

13. A system as claimed in claim 12, wherein the means to process the information comprises store means connected to receive the transmitted information, respective adder means for each number connected to the output of the store means, respective comparison means connected to the outputs of each adder means, and logic means connected to the outputs of the comparison means.

14. A system as claimed in claim 8, wherein the system is a telephone system and the concentrator is connected to the switching center by a plurality of pcm highways.

* * * * *